April 15, 1952
A. B. JONCAS
2,592,573
AUTOMATIC CRASH CURTAIN FOR MOTOR VEHICLES
Filed Oct. 21, 1949
2 SHEETS—SHEET 1
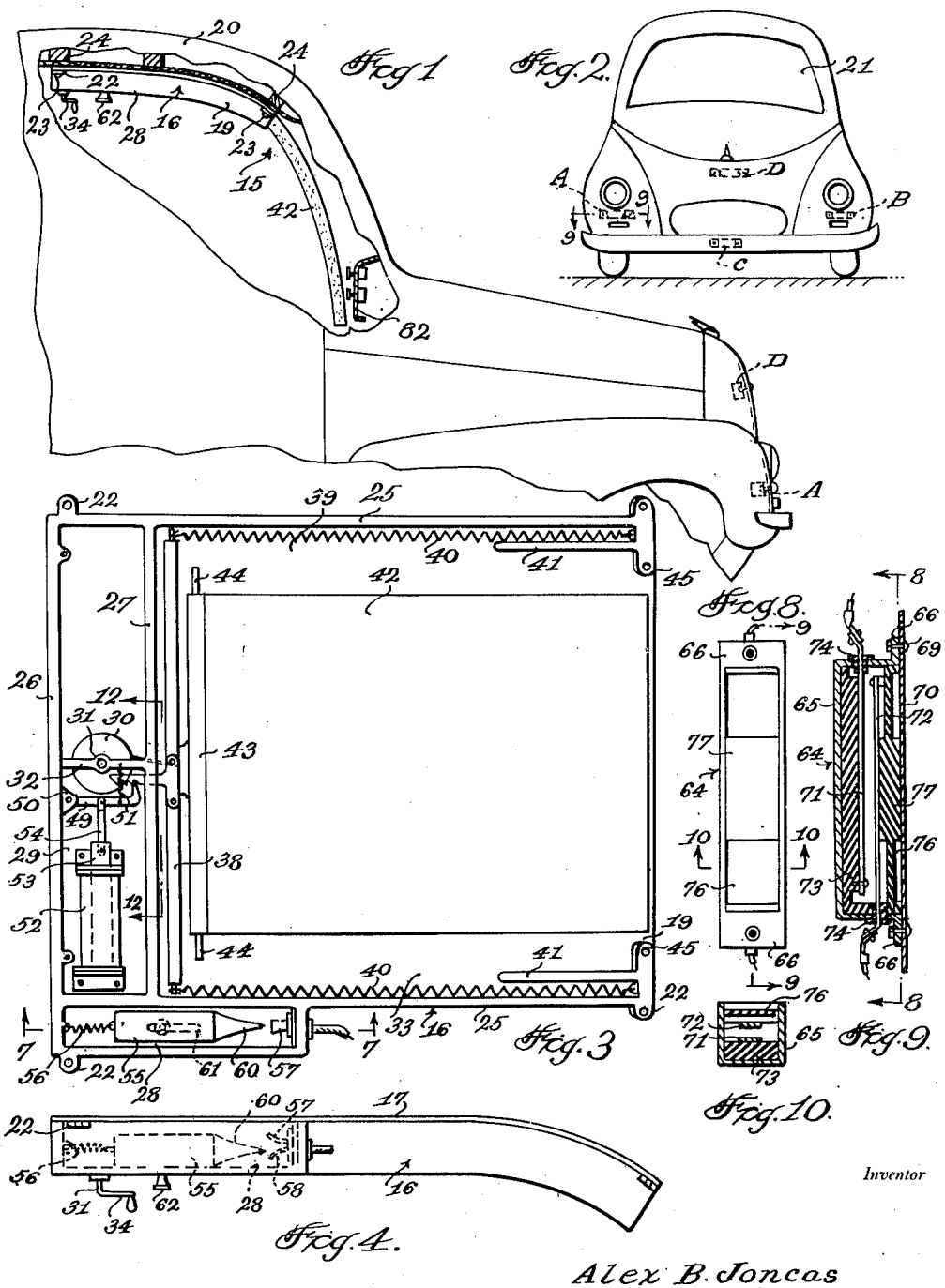
Inventor
Alex B. Joncas
By John N. Randolph
Attorney April 15, 1952  A. B. JONCAS  2,592,573
AUTOMATIC CRASH CURTAIN FOR MOTOR VEHICLES
Filed Oct. 21, 1949  2 SHEETS—SHEET 2
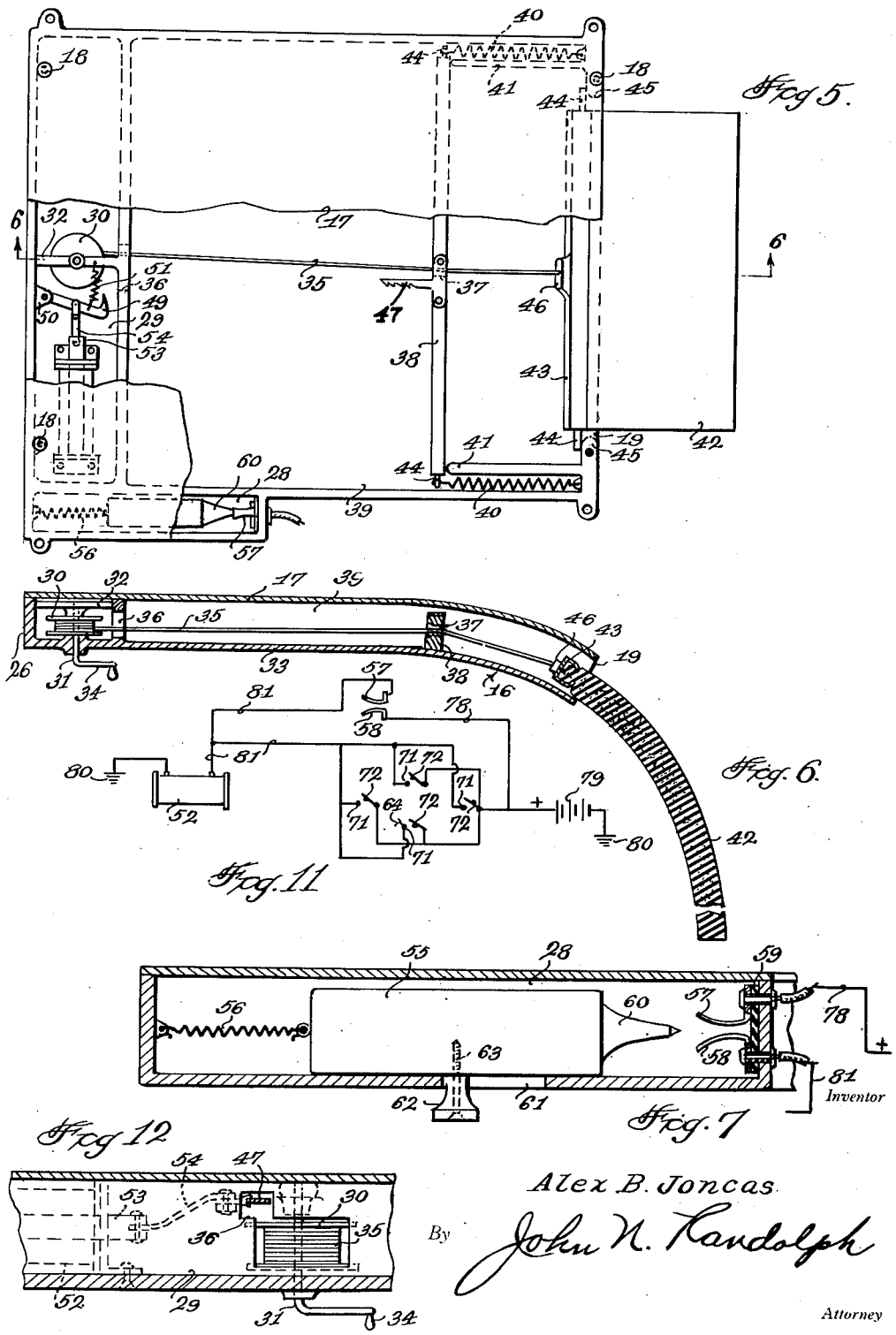
Inventor
Alex B. Joncas
By John N. Randolph
Attorney Patented Apr. 15, 1952

2,592,573

UNITED STATES PATENT OFFICE 2,592,573

AUTOMATIC CRASH CURTAIN FOR MOTOR VEHICLES

Alex B. Joncas, Detroit, Mich.

Application October 21, 1949, Serial No. 122,676

1 Claim. (Cl. 296—84)

This invention relates to a novel safety attachment for motor vehicles and more particularly to a crash curtain which is automatically released and projected from an inoperative position adjacent the roof of the vehicle to an operative position on the inner side of the vehicle windshield and instrument panel to protect the occupant or occupants from being thrown forcibly against the instrument panel or through the windshield.

Still another object of the invention is to provide a crash curtain having a novel release means which will function to release the crash curtain to be projected either upon collision or impact of the vehicle or in the event of a sudden stop without impact and where the impulse afforded by the momentum of the vehicle is sufficient to throw an occupant thereof forcibly against the instrument panel or windshield.

More particularly, it is a primary object of the present invention to provide a crash curtain for protecting the passenger of a motor vehicle riding in the front seat beside the driver and which is the most dangerous location in the vehicle in the event of a collision or a sudden stop as such passenger has nothing to protect him and prevent him from being thrown forcibly against the instrument panel and through the windshield.

Still a further object of the invention is to provide a crash curtain of relatively simple construction which is adapted to be mounted against the inner side of the roof of a vehicle and without requiring any modification or change in the vehicle roof and which is relatively compact.

Still another object of the invention is to provide a crash curtain which is capable of being readily reset after use.

Various other objects and advantages of the invention will hereinafter become more fully apparent from the following description of the drawings, illustrating a presently preferred embodiment thereof, and wherein:

Figure 1 is a fragmentary side elevational view of the forward portion of a motor vehicle broken away to show the crash curtain mounted therein and in a projected position;

Figure 2 is a front elevational view of the vehicle illustrating the location of the electric switches for releasing the crash curtain upon impact or collision;

Figure 3 is a top plan view, on an enlarged scale, of the housing of the crash curtain and showing the crash curtain disposed in a retracted position therein;

Figure 4 is an edge elevational view thereof;

Figure 5 is a top plan view similar to Figure 3 but showing the crash curtain in a projected position and showing the cover of the crash curtain housing applied thereto and broken away;

Figure 6 is a longitudinal sectional view taken substantially along a plane as indicated by the line 6—6 of Figure 5;

Figure 7 is an enlarged longitudinal sectional view taken substantially along a plane as indicated by the line 7—7 of Figure 3;

Figure 8 is a sectional view taken substantially along a plane as indicated by the line 8—8 of Figure 9;

Figure 9 is an enlarged sectional view taken substantially along a plane as indicated by the line 9—9 of Figure 2 and illustrating the details of one of the collision actuated switches;

Figure 10 is a cross sectional view of the switch taken substantially along a plane as indicated by the line 10—10 of Figure 8;

Figure 11 is a diagrammatic view of the electric circuit of the device, and

Figure 12 is an enlarged transverse sectional view taken substantially along a plane as indicated by the line 12—12 of Figure 3.

Referring more specifically to the drawings, the novel crash curtain unit in its entirety is designated generally 15 and includes an elongated housing 16 which is relatively thin as compared to its length and width and which is provided with a cover 17 which is detachably connected to the open top of the housing by a plurality of fastenings 18. The housing 16 is provided with a downwardly curved open end 19 and is shaped to fit flush against the under or inner side of the roof 20 of a motor vehicle directly above and behind the vehicle windshield 21 and extends longitudinally of the roof 20 and with its open, downwardly curved end 19 disposed in a forward most position. The housing 16 is provided with apertured extensions or ears 22 for receiving fastenings 23 which extend upwardly therethrough and are adapted to be anchored in cross ribs 24 of the vehicle roof 20.

As best illustrated in Figures 3 and 5, the housing 16 includes corresponding side walls 25, a rear end wall 26, a transverse inner wall or partition 27 which is disposed adjacent said end wall 26 and the side compartment or chamber 28 which extends longitudinally of the housing 16 and which is located on the outer side of one side wall 25 thereof and extends from the end wall 26 part way to the opposite, open end 19 of the housing. Portions of the side walls 25 together with the end wall 26 and partition 27 form a transverse compartment 29 containing a reel 30 which is secured to a shaft 31. The upper end of the shaft 31 is journaled in a bearing 32 which extends transversely of the compartment 29 between the wall 26 and partition 27. The shaft 31 extends downwardly through and is journaled in the bottom 33 of the housing 16 and terminates in a crank 34, as seen in Figure 4, which is disposed beneath the housing 16. A strong flexible member 35, which may be formed of fine steel wire, is wound on the reel 30, as best illustrated in Figure 6, and has one end extending therefrom through an opening 36 in the partition 27 and through an opening 37 in the intermediate portion of an elongated bar 38. The bar 38 is disposed transversely within the housing 16 and in the larger compartment 39 thereof which extends between the open end 19 of said housing and said partition 27. The bar 38 is of a length only slightly less than the width of the chamber 39. A contractile coiled spring 40 is fastened to each end of the bar 38 and said springs 40 extend longitudinally of the compartment 39 and are anchored at their opposite ends to the housing 16 adjacent the open end 19. The compartment 39 contains two bars 41 which extend from adjacent the open end 19 thereof a short distance longitudinally of said compartment and toward the partition 27 and each of said bars 41 is disposed adjacent a side wall 25 of the housing. The springs 40 have portions extending between the side walls 25 and said bars 41 and as best illustrated in Figure 5, the inner ends of the bars 41 form stops to be engaged by the bar 38 to limit its movement toward the open end 19 of the housing under the biasing action of the springs 40.

A curtain 42 comprising a relatively thick pad of a cushioning material, preferably sponge rubber is adapted to be normally contained within the chamber 39 between its open end 19 and the bar 38, when said bar is in a retracted position, as seen in Figure 3. A channel member 43 is clamped to one end of the crash curtain 42 and is normally disposed adjacent the bar 38 and has extensions 44 at the ends thereof which are adapted to pass between the bars 41, when the crash curtain 42 is projected, and to engage inwardly extending head portions 45 of said bars which extend toward one another and which are located adjacent the open housing end 19 so that said portions 45 form stops to be engaged by the extensions 44 to support the crash curtain in an extended positon, as best illustrated in Figure 5. The end of the flexible member 35 which extends from the reel 30 through the openings 36 and 37 is secured in an intermediate portion 46 of the clamping member 43.

A rack or latch bar 47 has a base portion which is fastened to the bar 38 and extends transversely therefrom toward the partition 27 and is disposed to pass freely through the opening 36 which is enlarged to accommodate the rack bar 47. The teeth of the rack bar 47 which are formed in one side edge thereof are each inclined in a direction toward the bar 38. A latching pawl 49 is swingably disposed in the chamber 29 and is pivotally mounted on a bracket 50 which is secured to the rear wall 26 for swinging movement toward and away from the bearing 32 above the level of the reel 30 and is spring biased to swing toward said bearing 32 by a pull spring 51 which is fastened to the pawl 49 and to the bearing 32. Accordingly, it will be seen that when the bar 38 approaches the partition 27 and the latch bar 47 moves through the opening 36 and into the chamber 29 that the teeth of the latch bar 47 are arranged to retract the latch pawl 49 against the action of the spring 51 and so that the bill of the pawl will ride over the inclined surfaces of the teeth but will engage the opposite surfaces to latch the bar 38 in a retracted position adjacent the partition 27 to hold it thus disposed and against the action of the springs 40.

A solenoid 52 is secured in the chamber 29, between the compartment 28 and the latch pawl 49 and is provided with a core 53 which projects from the solenoid 52 toward said latch pawl. A link 54 is pivotally connected at one end thereof to the intermediate portion of the pawl 49 and at its opposite end to the adjacent end of the solenoid core 53.

The chamber 28 contains an elongated weight 55 which is slidably mounted therein for movement longitudinally of said chamber 38 and of the housing 16. A contractile coiled spring 56 is connected to the rear end of the weight 55 and to the end wall 26 for normally retaining the weight 55 in a retracted position and away from a pair of transversely spaced resilient electrical condutors 57 and 58 which are disposed in the forward end of the chamber 28 and insulated from the housing 16 by the insulating member 59, as best seen in Figure 7. The weight 55 is provided with a tapered forward end 60 adapted to move between and into engagement with the contacts 57 and 58 when said weight is projected forwardly and is formed of an electrical conducting material for bridging the contacts. The bottom wall of the chamber 28 is provided with a longitudinally extending slot 61 in which a portion of a knob 62 is slidably disposed. Said knob 62 projects from the bottom of the chamber 28 and is secured to the weight 55 by a screw 63. The knob 62 functions as a stop for limiting the longitudinal sliding movement of the weight 55 in both directions and as a manual means for displacing said weight 55 to either a projected or a retracted position.

The forward end of the vehicle is provided with a plurality, preferably four, collision actuated electric switches, each designated generally 64, one of which is located on the inner side of the forward portion of the right front fender at the point A, another of which is similarly located in the left front fender at the point B, another of which is located in the central portion of the front bumper at the location C and the other of which is located in the front portion of the body of the vehicle above the grill at the point D. Each of the switches 64 includes an elongated housing 65 having an open front wall and provided with flanges 66 at the ends thereof to receive fastenings 69, as best seen in Figure 9, for securing the open front wall of the housing 65 against the inner side of a piece of metal 70 constituting the front of the body, the front part of the fenders or the front bumper. Each of the switches 64 includes a pair of elongated conductor strips 71 and 72 which extend longitudinally thereof. The strip 71 is insulated from the housing 65 by a strip of electrical insulating material 73 and by an insulating bushing 74 and the strip 72 is insulated from the housing 65 by a similar bushing 74 and a strip of insulating material 76 which is secured across and closes the open front of the housing 65 and which is provided with a thickened intermediate portion 77 which bears against the conductor strip 72. The strips 71 and 72 are normally disposed in spaced substantially parallel relationship, as seen in Figures 9 and 10 and the thickened insulating portion 77 likewise bears against the body or bumper portion to which said switch is secured.

Referring to Figure 11 wherein the electric circuit of the release means for the crash curtain is illustrated, a conductor 78 extends from the positive side of a source of electric current 79, as for example the storage battery of the motor vehicle which is grounded to the frame at 80 and has branch conductors which are connected to the contact 58, and the contact strips 72 of each of the four switches 64. A conductor 81 is connected to the positive terminal of the solenoid 52 and has branch conductors connected with contact 57 and each of the contact strips 71. The negative post of the solenoid 52 is grounded in the frame of the vehicle as seen at 80.

Assuming that the crash curtain 42 is disposed in a retracted position, as illustrated in Figure 3, if the vehicle on which the crash curtain is mounted collides with its front end against another vehicle or obstruction one or more of the switches 64 will be closed by the body or bumper portion of the vehicle being bent inwardly against the insulating block 77 of said switch causing said block to force the conductor strip 72 inwardly and against the adjacent conductor strip 71 for closing the electric circuit, as seen in Figure 11, to the solenoid 52 to thereby energize said solenoid for drawing the core 53 thereof into the solenoid thereby to retract the latch pawl 49 away from the latch bar 47. When the latch bar 47 is thus released the springs 40 will force the bar 38 to move rapidly toward the open end 19 of the housing 16 until its movement is stopped by engagement with the stop members 41. This impetus of the bar 38 will be imparted to the clamp 43 for projecting the curtain 42 which will be projected forcibly outwardly and downwardly of the open end 19 of the casing. The curtain 42 is of sufficient length to cover the inner side of the windshield and the instrument board and is sufficiently stiff, due to its thickness, to assume the position of Figure 1 when projected to thereby afford a thick cushioning pad to protect the occupant of the front seat of the vehicle, located behind said curtain 42, from being thrown through the widshield 21 or forcibly against the instrument panel 82. It will be readily apparent that the crash curtain 42 will thus be projected by the closing of any one of the switches 64 and the switch 64 located at the point D is particularly provided for closing the solenoid circuit should the front end of the vehicle strike the rear end of a truck, as for example a stake truck, where the rear end of the truck frame or bed is disposed too high to contact the vehicle bumper or front fenders. Likewise, it frequently occurs that a passenger of a vehicle will be thrown forcibly against the instrument panel or through the windshield where brakes are applied very forcibly while the vehicle is traveling at a high speed and without the vehicle actually colliding or striking an obstruction. When this occurs, the impetus of the weight 55 will cause said weight to slide forwardly in the chamber 28 against the action of the spring 56 and into contact with the two contacts 57 and 58 to thereby close the solenoid circuit to cause the crash curtain 42 to be projected. It will be apparent that this will likewise occur when the vehicle strikes an obstruction or collides with another vehicle and when one or more of the switches 64 are closed thereby. Obviously, a complete unit 15 may be mounted above the right front seat of the vehicle and a similar unit mounted above the left front seat for protecting the vehicle operator, both of which units may be connected in the same circuit.

After the crash curtain 42 has been projected, it may be readily re-set by manually turning the crank 34 in a direction for re-winding the flexible member 35 on the reel 30 to thereby draw the crash curtain 42 back to its retracted position of Figure 3 and in so moving, the bar 38 will be carried by the clamp 43 back to the position of Figure 3 and latched in a retracted position, as previously described.

Various modifications and changes are contemplated and may obviously be resorted to, without departing from the spirit or scope of the invention as hereinafter defined by the appended claim.

I claim as my invention:

An occupant protecting device for motor vehicles comprising a housing adapted to be secured to the underside of the roof of a motor vehicle and having an open forward end disposed above and adjacent the vehicle windshield, a relatively thick cushioning pad forming an elongated crash curtain slidably mounted in the housing for sliding movement through the open end thereof, said curtain having a trailing end provided with stop means engaging a portion of the housing for retaining said trailing end therein to support the crash curtain in a depending, projected position relatively to the open end of the housing, a bar slidably disposed in the housing and engaging the trailing end of the crash curtain for displacing the crash curtain from a retracted position within the housing to a projected position, spring means anchored in the housing adjacent its open end and connected to said bar and normally urging the bar and crash curtain toward projected positions, latch means within said housing releasably latching the bar in a retracted position, manually actuated reel means contained within the housing and connected to the crash curtain for moving the crash curtain and bar to retracted positions, a solenoid disposed in the housing adapted to be connected to and energized by the storage battery of the vehicle having a core connected to said latch means for releasing the latch means when the solenoid is energized, a normally open switch interposed in the circuit of the solenoid and secured in the housing, and a weighted member slidably supported in said housing and adapted to be propelled by inertia upon sudden stopping of the vehicle into a position for closing the normally open switch to energize said solenoid.

ALEX B. JONCAS.

REFERENCES CITED

The following references are of record in the file of this patent:

UNITED STATES PATENTS

| Number | Name | Date |
|---|---|---|
| 1,572,038 | Reinheimer | Feb. 9, 1926 |
| 1,624,418 | Marsh | Apr. 12, 1927 |
| 2,050,141 | Withington | Aug. 4, 1936 |
| 2,477,933 | Labser | Aug. 2, 1949 |

FOREIGN PATENTS

| Number | Country | Date |
|---|---|---|
| 175,798 | Great Britain | Mar. 2, 1922 |
| 689,857 | France | Feb. 13, 1930 |